May 10, 1949.  L. S. SUBBER  2,469,613
SNAP GAUGE
Filed June 3, 1944
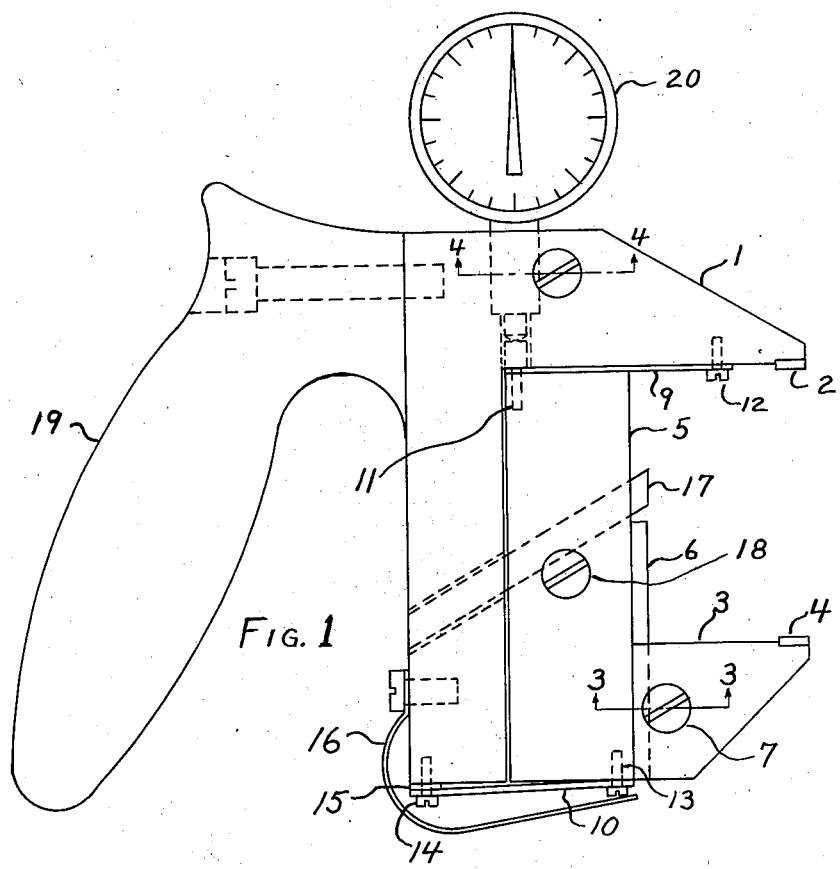
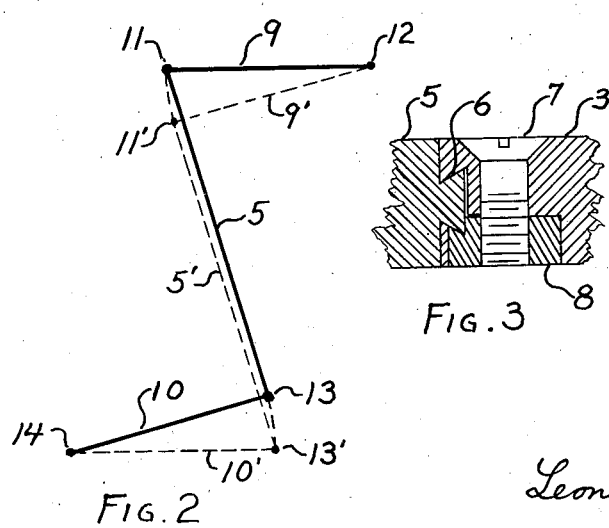
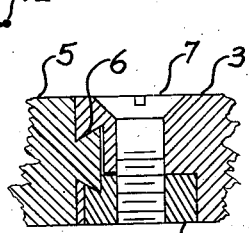
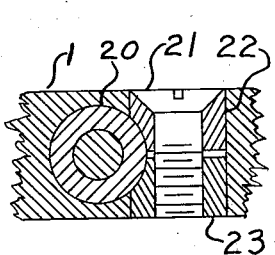
INVENTOR
Leonard Saul Subber Patented May 10, 1949

2,469,613

UNITED STATES PATENT OFFICE 2,469,613

SNAP GAUGE

Leonard Saul Subber, Upper Darby, Pa.

Application June 3, 1944, Serial No. 538,668

13 Claims. (Cl. 33—147)

My invention relates to measuring apparatus for accurately determining linear size relationships, such as diameters or distances between plane surfaces or surfaces of revolution, with respect to a standard part or dimension, and is herein shown as embodied in an external gage for measuring rectangular surfaces or surfaces of revolution.

It is customary while machining articles, such as machine parts, for the operator to stop the machine and apply a measuring device—either fixed, adjustable, limit or indicating—to determine how far the operation has progressed. In many cases, due to the nature of the measuring device or gage, measurements must be taken indirectly, thereby introducing additional errors. In most cases, even though the measurement can be taken directly without removing the part from the machine, the measurement is inaccurate and cannot be duplicated even by skilled operators. Therefore, one object of my invention is to provide a simple, compact, comparatively inexpensive apparatus which can be used by different individuals such as an operator at a machine or by an inspector at some other location to obtain duplicate measurements.

Another object of my invention is to provide a device which requires little or no skill to operate.

Another object of my invention is to provide an instrument which is self-locating with respect to the work part.

Another object of my invention is to provide a gage which will measure equally well at an unobstructed portion of the work and also directly adjacent to common obstructions such as shoulders or flanges.

Another object of my invention is to provide a gage which will measure directly in places usually considered inaccessible such as undercuts provided for tool relief or recesses like ring grooves in pistons.

Another object of my invention is to provide a device which can be used to measure directly work parts while the parts are in the machine, the device being so proportioned that it will clear the usual obstacles found on machines such as holding devices, fixtures and wheel guards.

Another object of my invention is to provide a gage which can be held in a suitable stand for use as a bench comparator when the nature of the work indicates that the work should be presented to the gage.

Another object of my invention is to provide a gage which can be adjusted and set to take measurements at predetermined locations on irregular surfaces. An example of this is the checking of the chordal width of an involute gear tooth.

Another object of my invention is to provide a gage of such size and proportions that several gages can be grouped closely in suitable holding means for simultaneously checking a plurality of dimensions such as diameters, shoulder lengths and concentricity.

Another object of my invention is to provide a gage so designed that in many instances measurements can be taken while the work part is in motion, as for instance, measuring a shaft diameter or a flange width without stopping the machine.

Another object of my invention is to provide a gage, the accuracy of which is not affected by room temperature or the temperature of the operator's hand.

Another object of my invention is to provide a gage, the operation and accuracy of which is not affected by normally present amounts of cutting fluids, lubricants, grit, dirt and other foreign matter.

Another object of my invention is to provide a gage that will not be damaged nor its accuracy impaired by impact or vibration which normally would be expected in shop use.

Another object of my invention is to provide a gage so designed that it can be adapted readily to special or unusual jobs by the addition of standard accessories which can be clamped on or removed rapidly without modifying or changing the gage in any way or impairing its usefulness. Examples of measurements made using accessories are checking lead-error, pitch diameter and drunkenness of screw threads; and checking strain in structures by measuring elongation due to load.

Other objects and advantages of my invention will be apparent from the following description, the appended claims, and the accompanying drawing, in which—

Fig. 1 is a side elevation of a measuring device embodying the present invention; Fig. 2, a schematic diagram illustrating the method of obtaining movement without friction; Fig. 3, a horizontal section on the line 3—3, Fig. 1; and Fig. 4, a horizontal section on the line 4—4, Fig. 1.

Similar numerals refer to similar parts throughout the several views.

The L-shaped frame member 1, made of one or more parts, is provided with an upper gaging anvil 2 suitably attached. The lower jaw 3 carries the lower gaging anvil 4.

Fig. 3 shows the preferred method of adjustably attaching lower jaw 3 to the control member 5 so that members 3 and 5 move as an L-shaped unit. The lower jaw 3 is retained in correct juxtaposition to control member 5 by means of screw 7 which engages nut 8 which in turn clamps against the dovetail 6 on the control member 5 locking the lower jaw 3 and control member 5 together.

The control member 5 is attached to the frame member 1 by means of two flat springs or reeds 9 and 10 the L-shaped frame member 1 and the movable L-shaped unit together forming a generally U-shaped body or frame in which one of the anvil-carrying arms is adjustable to-and-fro relative to the other arm. The upper reed 9 is fastened at one end to control member 5 by suitable means such as screw 11. The other end of reed 9 is attached to the frame 1 by suitable means such as screw 12. One end of the lower reed 10 is fastened to the control member 5 by suitable means such as screw 13, while the other end of reed 10 is attached to the frame 1 by a suitable fastening device such as screw 14.

Fig. 2 illustrates schematically the relative movement between the reeds and the control member which act, in effect, like a Z-shaped linkage wherein the inner ends of the reeds overlap and are fastened to the member 5 and extend outwardly therefrom in opposite directions to their respective points of attachment to the L-shaped frame member 1. The upper reed 9 pivots about screw 12 when the control member 5 is forced downward relative to the frame member 1 by placing a part to be inspected between the gaging anvils 2 and 4, assuming the position indicated by 9'. At the same time, the lower reed 10 pivots about screw 14, assuming the position indicated by 10', while the control member 5 assumes the position indicated by 5'. Suitable means, such as the spacer 15, are provided for maintaining the correct angular generally non-parallel relationship between the upper and lower reeds 9 and 10.

Since the reeds are so proportioned and aligned that the control member 5 remains substantially parallel to the vertical leg of the frame member 1 while moving vertically, the anvils 2 and 4 remain substantially parallel to each other throughout their range of travel.

Moreover, since the control member 5 does not touch the frame member 1, nor slide against it, movement of the control member 5 relative to the frame member 1 is obtained without friction or lost motion. Furthermore, normal expansion and contraction of the frame member 1 produces no measurable error of measurement.

Fixed measuring pressure is provided by a low-gradient spring 16 which urges anvil 4 toward anvil 2 by exerting an upward thrust against the control member 5.

The backstop 17, which is a sliding fit in the control member 5, is provided to properly locate the part being measured between the anvils 2 and 4. It is locked in the control member 5, against rotation and axial movement, by suitable means indicated at 18. The backstop 17 extends into a clearance hole in the frame member 1 which limits the travel of the control member 5, preventing damage to the reeds 9 and 10 and spring 16.

The handle 19 is made of suitable material to provide proper balance and to insulate the instrument from the heat of the operator's hand.

A suitable indicating mechanism 20, such as a dial indicator; or a pneumatic, hydraulic, or electrical gage—is mounted in the frame member 1 in such a manner that it can be rotated, through an arc of 360 degrees, to the most convenient position for observation or to clear obstacles. Fig. 4 shows the preferred method of locking the indicator 20 in the desired position. The screw 21 passes through the collar 22 and engages the nut 23. Both the collar 22 and the nut 23, which are machined to fit the stem of the indicator 20, are free to slide in the frame member 1. Tightening screw 21 causes the collar 22 and the nut 23 to bind against the indicator 20 and the frame member 1.

The indicator 20 is actuated by the screw 11 which transmits the vertical movement of the lower jaw 3 through the control member 5. Since the insertion of a part to be measured between the anvils 2 and 4 moves the actuating screw 11 away from the indicator 20, rapid insertion will not damage the indicator 20.

The distance between the anvils 2 and 4 is substantially the same as the exposed length of the control member 5. Therefore, the measurement taken by the instrument is controlled by the length of the control member 5. By making the control member 5 of a material having the proper thermal coefficient of linear expansion, the measuring device can be made to compensate automatically for room temperature changes, for a specified material to be measured. When materials with different coefficients of expansion are to be measured, suitable control members 5, with proper rates of expansion can be quickly and easily substituted.

The overlap mounting of the leafs 9 and 10 upon the member 5, to form Z-shaped linkage, as described hereinabove, provides greater stability for the member 5 than would be the case if the two mountings were in vertical alignment and thereby minimizes "wobbling" or tilting of the lower jaw 3 and the anvil 4. This mounting also facilitates the quick interchange or substitution of control members having different coefficients of expansion as explained above and permits proportioning of the gauge so as to accomplish the objectives set forth herein.

While the form of apparatus herein described constitutes a preferred embodiment of my invention, it is to be understood that the invention is not limited to this precise form, and that changes may be made therein without departing from the scope of the invention which is defined in the appended claims.

I claim:

1. A measuring device comprising a frame member, a fixed work-engaging element carried by said frame member, a second work-engaging element, and means movably mounting said second element upon said frame member so as to permit said second element to move to-and-fro substantially perpendicularly relative to said fixed element, said means including a base upon which said second element is mounted, said base extending generally perpendicularly from said second element toward said fixed element, and a pair of oppositely-directed leaf springs connected to the ends of said base and fastened to said frame member.

2. A measuring device comprising a frame member, a fixed upper work-engaging jaw carried by said frame member, a lower work-engaging jaw, and means movably mounting said lower jaw upon said frame member so as to permit said lower jaw to move substantially vertically toand-fro relative to said upper jaw, said mounting means including a generally vertical base upon which said lower jaw is mounted and a pair of leaf springs connecting the top and bottom respectively of said base to said frame member, said leaf springs being connected to said base at generally diagonally-related points and extending oppositely therefrom generally Z-wise and being connected at the other ends to said frame member at laterally-spaced points, the accuracy of measurements taken by said device being substantially independent of and unaffected by expansion and contraction of said frame member.

3. A measuring device comprising a frame member, a fixed upper work-engaging jaw carried by said frame member, a lower work-engaging jaw, and means movably mounting said lower jaw upon said frame member so as to permit said lower jaw to move substantially vertically to-and-fro relative to said upper jaw, said mounting means including a generally vertical base upon which said lower jaw is mounted and a pair of generally non-parallel leaf springs connecting the top and bottom respectively of said base to said frame member, said leaf springs being connected to said base at generally diagonally-related points and extending oppositely therefrom generally Z-wise and being connected at the other ends to said frame member at laterally-spaced points, said base being constructed and arranged for quick attachability and detachability, by means of two fasteners thereby to permit interchange of a plurality of bases having different co-efficients of linear expansion.

4. A measuring device comprising a frame member, a fixed upper work-engaging jaw carried by said frame member, a lower work-engaging jaw, and means movably mounting said lower jaw upon said frame member so as to permit said lower jaw to move substantially vertically to-and-fro relative to said upper jaw, said mounting means including a generally vertical member disposed adjacent said frame member, a pair of leaf springs connecting the top and bottom respectively of said vertical member to said frame member, said leaf springs being connected at one end to generally diagonally-related points on said vertical member and extending generally Z-wise therefrom and being connected at the other ends to laterally-spaced points on said frame member, and a slide and lock connecting said lower jaw to said vertical member so as to permit vertical adjustment of said lower jaw along said vertical member thereby to vary the clearance intermediate said upper and lower jaw.

5. A measuring device comprising a frame member, a fixed upper work-engaging jaw carried by said frame member, a lower work-engaging jaw, means movably mounting said lower jaw upon said frame member so as to permit said lower jaw to move substantially vertically to-and-fro relative to said upper jaw, said mounting means including a generally vertical member disposed adjacent said frame member, a pair of leaf springs connecting the top and bottom respectively of said vertical member to said frame member, said leaf springs being connected at one end to generally diagonally-related points on said vertical member and extending generally Z-wise therefrom and being connected at the other ends to laterally-spaced points on said frame member, and including means connecting said lower jaw to said vertical member, and a work-backstop carried by said vertical member and extending into an oversize hole in said frame member, said work-backstop thereby serving to limit the movement of said vertical member relative to said frame member.

6. A measuring device comprising a frame member, a fixed upper work-engaging jaw carried by said frame member, a movable lower work-engaging jaw, a generally vertical member disposed adjacent said frame member, a pair of leaf springs connecting the top and bottom respectively of said vertical member to said frame member, said leaf springs being connected at one end to generally diagonally-related points on said vertical member and extending generally Z-wise therefrom and being connected at the other ends to laterally-spaced points on said frame member so as to permit said vertical member to move substantially vertically to-and-fro relative to said upper jaw, a slide and lock connecting said lower jaw to said vertical member so as to permit vertical adjustment of said lower jaw along said vertical member thereby to vary the clearance intermediate said upper and lower jaws, and a diagonally-adjustable work-backstop adapted to contact the work at a point 90 degrees between said upper and lower jaws regardless of the work-diameter, said work back-stop being carried by said vertical member and extending into an oversize hole in said frame member, said work-backstop thereby serving to limit the movement of said vertical member relative to said frame member.

7. A measuring device comprising a generally U-shaped frame made up of an upper inverted L-shaped member and a lower upright L-shaped member, the vertical arms of said L-shaped members being generally parallel with a clearance therebetween, the horizontal arm of said upper member providing an upper work-contacting jaw, the horizontal arm of said lower member providing a lower work-contacting jaw, the work contacting jaw of the lower L-shaped member being adjustably mounted on its vertical member, said lower L-shaped member being movably mounted on said upper L-shaped member by means of a Z-shaped linkage formed by the lower vertical member and substantially horizontal flexible reeds, said reeds being attached to both L-shaped members, said linkage imparting substantially parallel relative movement between the upper and lower jaws, and indicating mechanism mounted upon said upper member and constructed and arranged to indicate relative movement of said lower member, said lower member being adapted to move away from said indicating mechanism upon increase in size of the work thereby to protect said indicating mechanism from shock.

8. A measuring device comprising a generally U-shaped frame made up of an upper inverted L-shaped member and a lower upright L-shaped member, the vertical arms of said L-shaped members being generally parallel with a clearance therebetween, the horizontal arm of said upper member providing an upper work-contacting jaw, the horizontal arm of said lower member providing a lower work-contacting jaw, means movably mounting said lower L-shaped member upon said upper L-shaped member, said mounting means being constructed and arranged to permit the lower jaw to move substantially vertically relative to said upper jaw by means of a Z-shaped linkage formed by the vertical arm of the lower L-shaped member and substantially horizontal flexible reeds affixed thereto, said reeds being attached also, at their extremities, to the upper L-shaped member, and indicating mechanism mounted upon said upper member and constructed and arranged to indicate movement of said lower member relative to said upper member.

9. A measuring device comprising a generally U-shaped frame made up of an upper inverted L-shaped member and a lower upright L-shaped member, the vertical arms of said L-shaped members being generally parallel with a clearance therebetween, the horizontal arm of said upper member providing an upper work-contacting jaw, the horizontal arm of said lower member providing a lower work-contacting jaw, means movably mounting said lower L-shaped member upon said upper L-shaped member, said mounting means being constructed and arranged to permit the lower jaw to move substantially vertically relative to said upper jaw, said mounting means including an upper leaf spring connecting the top of the vertical arm of the lower L-shaped member to the horizontal arm of the upper L-shaped member and a lower leaf spring connecting the bottom of the vertical arm of said lower L-shaped member to the bottom of the vertical arm of said upper L-shaped member, and indicating mechanism mounted upon said upper member and constructed and arranged to indicate movement of said lower member relative to the upper member.

10. A measuring device comprising a generally U-shaped frame made up of an upper inverted L-shaped member and a lower upright L-shaped member, the vertical arms of said L-shaped members being generally parallel with a slight clearance therebetween, the horizontal arm of said upper member providing an upper work-contacting jaw, the horizontal arm of said lower member providing a lower work-contacting jaw, means movably mounting said lower L-shaped member upon said upper L-shaped member, said mounting means being constructed and arranged to permit the lower jaw to move substantially vertically relative to said upper jaw, said mounting means including an upper leaf spring connecting the top of the vertical arm of the lower L-shaped member to the horizontal arm of the upper L-shaped member and a lower leaf spring connecting the bottom of the vertical arm of said lower L-shaped member to the bottom of the vertical arm of said upper L-shaped member, said leaf springs being connected at generally diagonally-related points on the vertical arm of said lower L-shaped member and extending Z-wise therefrom to their points of attachment to said upper L-shaped member, and an indicating gauge mounted upon the top of said upper L-shaped member and constructed and arranged to indicate movement of the lower L-shaped member relative to the upper L-shaped member.

11. A measuring device comprising a fixed work-contacting jaw, a second work-contacting jaw, and connecting means intermediate said jaws constructed and arranged to permit generally perpendicular movement of said second jaw relative to the fixed jaw, said means consisting of a pair of oppositely extending leaf springs, one pair of opposite extremities of the leaf springs being attached to one of the said jaws, the other pair of opposite extremities being attached to the other jaw to form a generally Z-shaped linkage.

12. A measuring device comprising a fixed work-contacting jaw, a second work-contacting jaw arranged generally parallel to the fixed jaw, and connecting means intermediate said jaws constructed and arranged to permit such movement of said second jaw relative to the fixed jaw as to maintain their general parallelism, said means including a generally Z-shaped spring linkage having a pair of spaced oppositely-extending generally non-parallel leaf springs, means connecting the outer ends of said leaf springs to said fixed jaw, and means connecting the inner ends of said leaf springs to said second jaw.

13. A measuring device comprising a generally U-shaped frame made up of an upper inverted L-shaped member and a lower upright L-shaped member, the vertical arms of said L-shaped members being generally parallel and having a clearance therebetween, the horizontal arm of said upper member providing an upper work-contacting jaw, the horizontal arm of said lower member providing a lower work-contacting jaw, said lower L-shaped member operably attached to said upper member by means of oppositely-extending flexible reeds attached at their extremities to the upper and lower members to form a Z-shaped linkage which imparts substantially parallel relative movement between the members, a work-backstop carried by the vertical arm of said lower L-shaped member and extending into an oversize hole in the vertical arm of said upper L-shaped member, said work-backstop thereby limiting the movement of said lower L-shaped member relative to said upper L-shaped member, and indicating mechanism mounted upon said upper member and constructed and arranged to indicate movement of said lower member relative to said upper member.

LEONARD SAUL SUBBER.

REFERENCES CITED

The following references are of record in the file of this patent:

UNITED STATES PATENTS

| Number | Name | Date |
|---|---|---|
| 361,056 | Emery | Apr. 12, 1887 |
| 1,258,426 | Mackintosh | Mar. 5, 1918 |
| 1,629,480 | Darlington | May 24, 1927 |
| 1,664,583 | Wheelock | Apr. 3, 1928 |
| 1,821,398 | Simpson | Sept. 1, 1931 |
| 1,879,559 | Smart | Sept. 27, 1932 |
| 2,190,306 | Balsiger | Feb. 13, 1940 |
| 2,197,198 | Street | Apr. 16, 1940 |
| 2,216,795 | Aller | Oct. 8, 1940 |
| 2,240,184 | Hathaway | Apr. 29, 1941 |